United States Patent
Gupta et al.

(10) Patent No.: US 10,375,210 B2
(45) Date of Patent: Aug. 6, 2019

(54) METHOD AND ARCHITECTURE FOR ACCESSING DIGITALLY PROTECTED WEB CONTENT

(71) Applicant: Infosys Limited, Bangalore (IN)

(72) Inventors: Shikha Gupta, New Delhi (IN); Ravi Sankar Veerubhotla, Hyderabad (IN); Ashutosh Saxena, Hyderabad (IN); Harigopal K. B. Ponnapalli, Hyderabad (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/662,911

(22) Filed: Mar. 19, 2015

(65) Prior Publication Data

US 2015/0269364 A1    Sep. 24, 2015

(30) Foreign Application Priority Data

Mar. 20, 2014    (IN) .......................... 1484/CHE/2014

(51) Int. Cl.
| | | |
|---|---|---|
| G06F 17/30 | (2006.01) | |
| H04L 29/06 | (2006.01) | |
| G06F 21/10 | (2013.01) | |
| G06F 7/04 | (2006.01) | |
| G06F 21/31 | (2013.01) | |

(52) U.S. Cl.
CPC .............. H04L 67/42 (2013.01); G06F 21/10 (2013.01); H04L 63/08 (2013.01); H04L 63/105 (2013.01); G06F 21/31 (2013.01); H04L 2463/101 (2013.01)

(58) Field of Classification Search
CPC ....... G06F 21/105; G06F 21/31; H04L 63/08; H04L 63/105; H04L 67/42; H04L 2463/101

USPC ................ 726/4, 27, 28; 713/168, 193, 150; 705/59

See application file for complete search history.

(56) References Cited

U.S. PATENT DOCUMENTS

| | | | |
|---|---|---|---|
| 7,171,558 B1 | 1/2007 | Mourad et al. | |
| 7,434,048 B1 * | 10/2008 | Shapiro | G06F 21/6218 713/165 |
| 7,484,103 B2 | 1/2009 | Woo et al. | |
| 7,565,438 B1 | 7/2009 | Zhu | |
| 7,707,643 B2 | 4/2010 | DeMello et al. | |
| 7,761,706 B2 | 7/2010 | Lambert | |
| 8,468,577 B1 * | 6/2013 | Pooley | G06F 21/604 726/1 |

(Continued)

FOREIGN PATENT DOCUMENTS

| | | |
|---|---|---|
| EP | 1376980 A1 | 1/2004 |
| KR | 20060093810 A | 8/2006 |

(Continued)

OTHER PUBLICATIONS

About Asynchronous Pluggable Protocols: https://msdn.microsoft.com/en-us/library/aa767916(v=vs.85).

*Primary Examiner* — Gary S Gracia
(74) *Attorney, Agent, or Firm* — Pepper Hamilton LLP

(57) ABSTRACT

The present disclosure provides method for accessing digital web content. It provides for selective access rights for users, to a web content. When the user tries to retrieve the data, the system checks for the rights available to the user, and accordingly implements the access before providing the content.

15 Claims, 4 Drawing Sheets

(56) References Cited

U.S. PATENT DOCUMENTS

| | | | |
|---|---|---|---|
| 8,978,106 B2* | 3/2015 | Swamy | G06F 17/00 705/27.1 |
| 2002/0077986 A1 | 6/2002 | Kobata et al. | |
| 2003/0037253 A1 | 2/2003 | Blank et al. | |
| 2004/0181490 A1* | 9/2004 | Gordon | G06F 21/10 705/59 |
| 2006/0048232 A1* | 3/2006 | Jung | H04L 63/0428 726/27 |
| 2006/0123025 A1 | 6/2006 | DeMello et al. | |
| 2006/0282391 A1* | 12/2006 | Peterka | G06F 21/10 705/57 |
| 2007/0051798 A1* | 3/2007 | Kawai | G06F 21/6209 235/382 |
| 2008/0084926 A1* | 4/2008 | Valenzuela | H04N 21/21 375/240.01 |
| 2008/0162353 A1 | 7/2008 | Tom et al. | |
| 2009/0183001 A1 | 7/2009 | Lu | |
| 2009/0217036 A1* | 8/2009 | Irwin | G06F 21/10 713/168 |
| 2009/0265278 A1* | 10/2009 | Wang | G06F 21/10 705/54 |
| 2012/0036452 A1* | 2/2012 | Coleman | G06F 21/55 715/751 |
| 2012/0084804 A1* | 4/2012 | Simmons | H04N 21/25816 725/28 |
| 2012/0117626 A1* | 5/2012 | Yates | H04L 9/3213 726/4 |
| 2012/0303974 A1* | 11/2012 | Lin | G06F 21/10 713/193 |
| 2013/0124849 A1* | 5/2013 | Steele | H04L 9/14 713/150 |
| 2013/0174272 A1* | 7/2013 | Chevalier | G06F 21/10 726/28 |
| 2013/0205401 A1* | 8/2013 | Lin | G06F 21/10 726/26 |
| 2013/0205402 A1* | 8/2013 | Lin | G06F 21/10 726/26 |
| 2013/0219512 A1* | 8/2013 | Lin | G06F 21/60 726/27 |
| 2013/0305383 A1* | 11/2013 | Garralda | G06Q 30/00 726/26 |
| 2014/0059708 A1* | 2/2014 | Chou | G06F 21/10 726/30 |
| 2015/0082416 A1* | 3/2015 | Strassmann | G06F 21/60 726/12 |
| 2015/0269364 A1* | 9/2015 | Gupta | H04L 63/08 726/4 |

FOREIGN PATENT DOCUMENTS

| | | |
|---|---|---|
| KR | 100709751 B1 | 4/2007 |
| WO | 0201326 A2 | 1/2002 |
| WO | 02057865 A2 | 7/2002 |
| WO | 2006065336 A1 | 6/2006 |
| WO | 2011047060 A1 | 4/2011 |

\* cited by examiner

METHOD AND ARCHITECTURE FOR ACCESSING DIGITALLY PROTECTED WEB CONTENT

RELATED APPLICATION DATA

This application claims priority to India Patent Application No. 1484/CHE/2014, filed Mar. 20, 2014, the disclosure of which is hereby incorporated by reference in its entirety.

FIELD OF THE INVENTION

The present disclosure generally relates to digital rights managements, more particularly, to a method and system for accessing digitally protected web content.

BACKGROUND

Digital Rights Management (DRM) techniques are used by publishers to protect, distribute, track and manage user rights for digital content. The digital content can be in the form of documents, e-books, audio, video, games, images etc. DRM controls the access of sensitive content by including information about the user rights (i.e., permissions, constraints, and obligations) associated with that content. It involves cryptographic techniques and access control mechanisms for preventing unauthorized access; and control usage of content.

The web content can consist of html, images, flash and active documents such as PDF. In a conventional DRM product, URLs to access the protected content has to use the protocol names such as rmfile (for local files) and rmhttp (for remote content). But in the case of mixed content, part of the content may have to be in plain format and part of it needs to be protected. In that case the proprietary protocols may not be able to interpret them. Many DRM solutions do not provide a uniform framework for the protection of multiple content types such as html, flash, digital media and executables with in a web page. Hence, the overall applicability of the present DRM solutions for web content is limited. In some DRM systems key management is an issue. The decryption keys may have to be stored locally to render the protected content.

Accordingly a uniform framework is required for the protection of multiple content types such as html, flash, digital media and executables with in a web page.

SUMMARY

The present disclosure provides a method executed by a content handler in a digital right management (DRM) architecture for accessing digitally protected web content, the method comprising, receiving a request from a user, at the content handler, for the web content from a digital protected web content server; transmitting, by the content handler, authentication data of the user and the request for the web content, to an authentication server associated with the web content server, for verification of access rights of the user to access the requested web content wherein the user has selective access rights on the web content; and retrieving, by the content handler, the requested web content and the verified access rights from the web content server if the access rights of the user on the requested web content are verified.

The present disclosure also provides a digital protected web content server system for storing and providing digital protected web content, the system comprising a directory and authentication server configured to store user details and authenticate users; a web server configured to manage web content uploaded by a user; and a database server configured to store access rights associated with a web content, the access rights being set by the user.

The present disclosure further provides a digital right management (DRM) architecture for digitally protected web content comprising, a content handler configured to receive request for the web content from a digital protected web content server; an authentication server in the web content server configured to receive an authentication data of the user along with the request for the web content, and verify access rights of the user to access the requested web content, using the received authentication data of the user, wherein the user has selective access rights on the web content; and the content handler further configured to retrieve the requested web content from a web content server and the verified access rights from the web content server in the event the access rights of the user on the requested web content are verified.

The present disclosure further provides at least one non-transitory computer-readable medium storing computer-readable instructions that, when executed by one or more computing devices, cause at least one of the one or more computing devices to request web content from a digital protected web content server; transmit authentication data of the user along with the request for the web content to an authentication server associated with the web content server, for verification of access rights of the user to access the requested web content wherein the user has selective access rights on the web content; and retrieve the requested web content and the verified access rights from the web content server in the event the access rights of the user on the requested web content is verified.

DETAILED DESCRIPTION

The present disclosure will now be explained by way of figures and examples.

The present disclosure provides a uniform framework for protection of multiple content types by using a content handler for authorized users.

The DRM Web Framework proposed here aims at applying Digital Rights Management for web content hosted on a public website. The framework is based on client-server architecture with the client being a content handler attached to a browser. The web content is hosted on webserver in protected format and a DRM server manages user rights for this content.

At the server side, all the web pages are kept encrypted. The decryption keys and rights related information of these encrypted web pages lies with the DRM server. Post authentication and authorization of a request from the client, the encrypted data and the related information are passed by the webserver. The web pages are decrypted at the client side and rendered by the browser after applying rights to the web page with the help of the rights plugin attached to the browser. The rights related information is passed on to the rights plugin from the content handler at runtime. This allows users with restricted privileges to access content according to the rights allocated to her. Also, the decryption keys and rights information is saved only in memory without any persistence on the disk.

Figure 1:
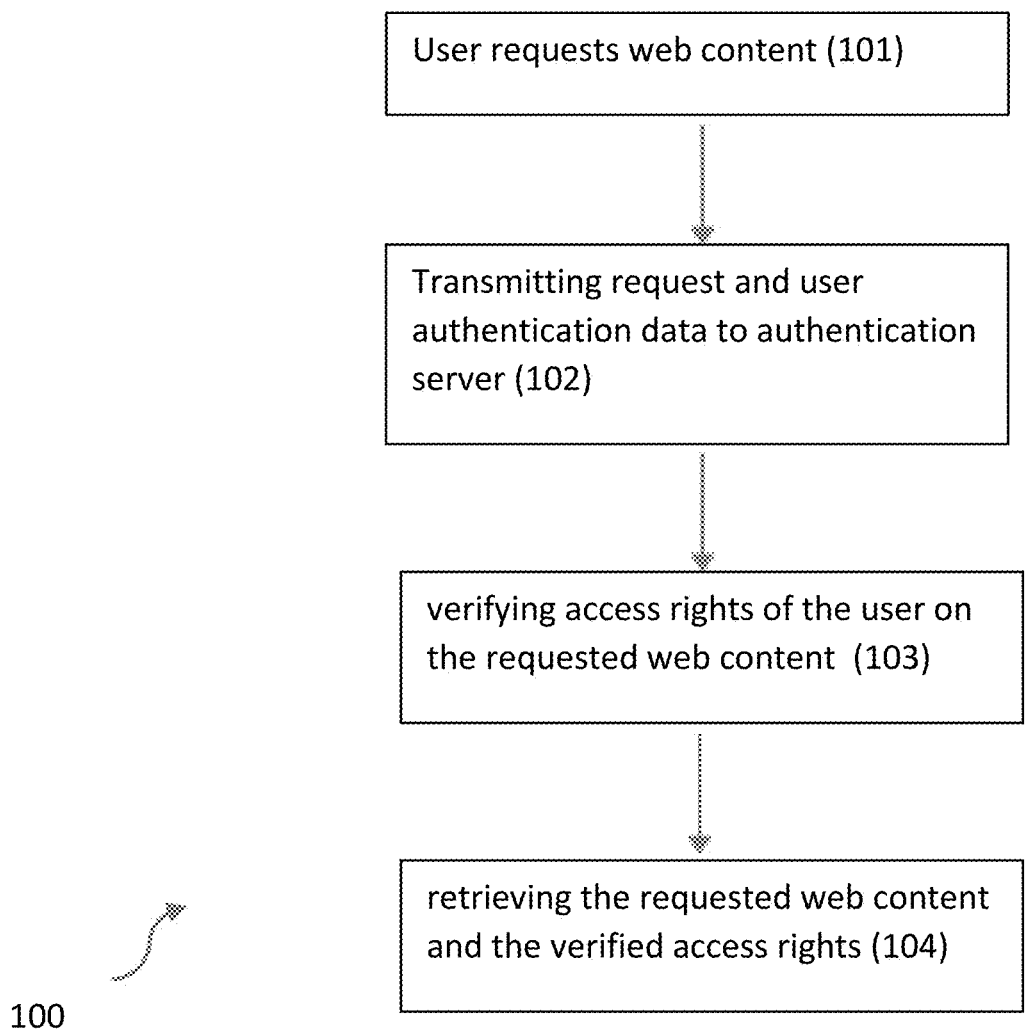
FIG. 1 is a flowchart describing a preferred embodiment of the process of the present disclosure.

FIG. 1 explains the main steps of the disclosure briefly. In a preferred embodiment of the present disclosure (100), a user sets access rights for content stored on a server. This user can be the content producer who manages user access.

These access rights are stored on a digital protected web content server, or a DRM server. For one web page comprising of different images, videos, text and other such contents, there can be different types of access rights set. One user can have read access to only the images. Only few users may have write access. Some content may be free for all.

When a new user comes to fetch the content, a request is sent along with authentication data of the user (101). A content handler is used for this purpose. The access rights of the user for the requested content are identified, using his authentication data (102). And the content for which he has appropriate rights are then retrieved for the user (103).

Figure 2:
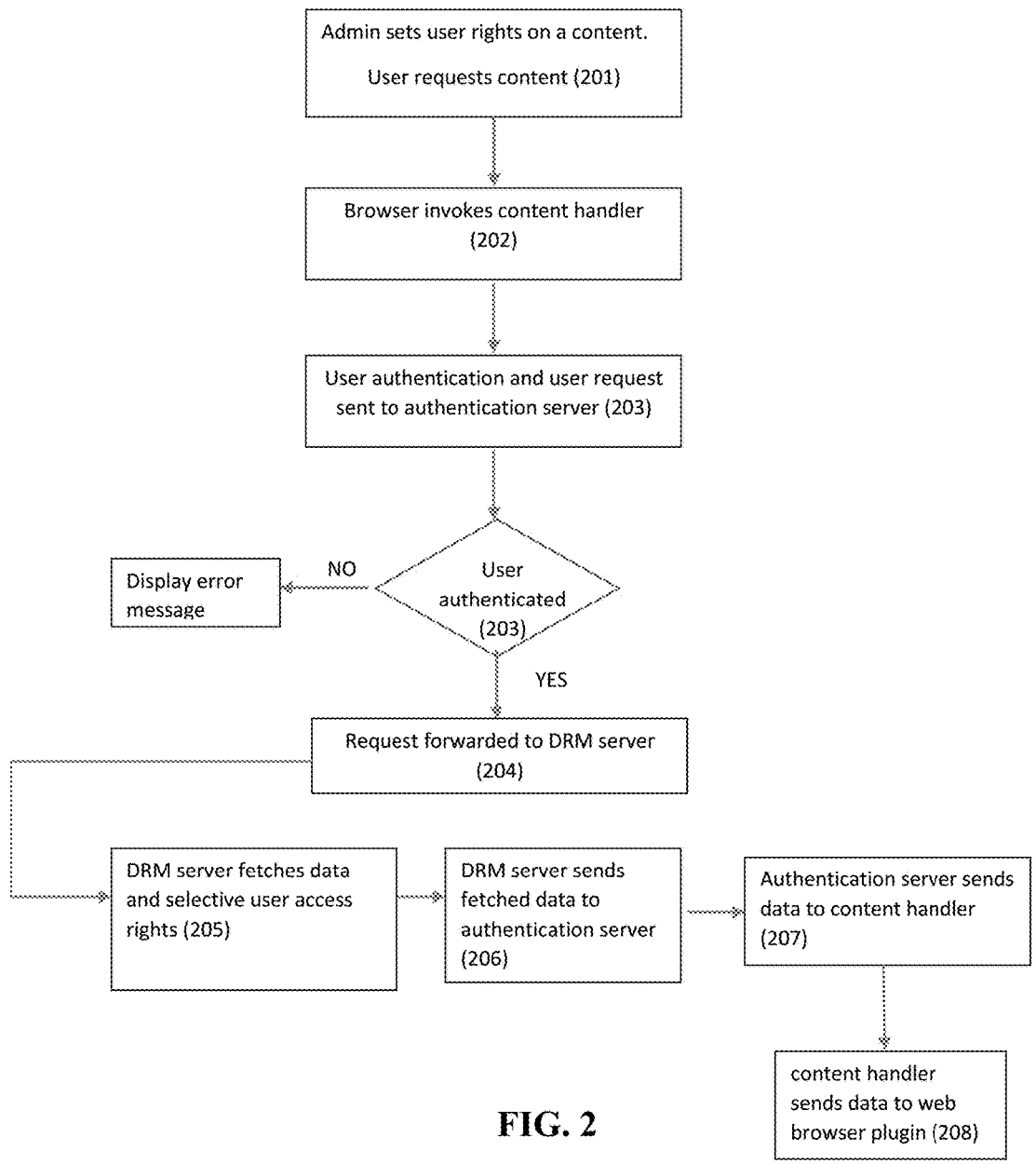
FIG. 2 describes a preferred embodiment of the work flow of a Protocol Handler.

FIG. 2 describes the detailed working of a preferred embodiment of the disclosure.

Initially access rights of users for a particular web content are set and stored in a DRM server. The web content is stored in a web server in a protected format. The protected format can be password protected or encrypted using any appropriate encryption algorithm.

In one embodiment a user requests for a web content at a browser (201). A content handler is invoked to take the request (202). In a one embodiment the content handler is a Protocol handler.

Protocol handler is an application/plugin which handles the user's URL request on the protocol scheme for which it is registered for a browser. Example protocols supported by browsers are http, https, ftp etc. Protocol handler is constructed to support new protocol drm://

In one embodiment, user requests web page with protocol scheme drm://" through a browser. The browser searches for the protocol handler registered for "drm" protocol and invokes it to handle the request.

In another embodiment the content handler is a mime type filter registered for the encrypted web pages with the application server. This can be done by associating a specific file extension (.drm) with the mime type(application/drm) with the application server and registry.

In this embodiment, user requests web page with the extension ".drm" to the browser. Browser forwards the request to the host and fetches the encrypted ".drm" web page. Further, the browser searches for the mime type of ".drm" extension in the registry. As we have registered "application/drm" mime type for ".drm", it is able to fetch the mime type and further searches for the mime type filter of "application/drm" mime type. Once found, it passes the ".drm" request to the mime type filter.

In yet another preferred embodiment, the web content is encrypted. Hence the user also requests for decryption key along with the web content.

The content handler then checks what access rights the user has. The user might not have privileges to retrieve the content. Or he may have access right only few parts of the web content. He also may not have access rights at all.

The content handler checks the user access rights from the authentication data entered by the user. In another embodiment the authentication data and the request is forwarded to an authentication server (203).

If the user is valid, the request for decryption key and rights is forwarded to DRM Server (204).

In another embodiment, if the authentication fails, appropriate error message is displayed to the user.

The DRM server fetches the data from the database (205) and sends it to the authentication server (206) which further forwards it to the content handler (207) along with the access rights.

The database can be a web server.

In one embodiment, the retrieved web content and the access rights are forwarded to a web browser plug in (208). This plugin is registered with a browser which loads with every instance of browser and adds rights management to its existing functionality.

In one embodiment, the web browser plug in is a Browser Helper Object (BHO).

A window procedure is created in place of the original one in the Browser helper object. It overrides the existing window procedure. The custom logic handles/filters messages based on the rights passed to it by content handler. For example: If save permission is given, only then the corresponding messages are passed to the default window procedure. If the user doesn't have the permission, the message isn't passed further hence the message processing flow is blocked in the window procedure itself.

The DRM server responsible for content and rights management, has three major functionalities i.e., user administration, content publication and user self-service. A DRM Administrators can add, delete and edit the users in the DRM group. Users can be of type publishers or consumers. The users identified as publishers have the right to upload their contents and assign rights to others.

An active directory authenticates the users and a DRM database stores rights information. The publisher who owns the content sets the user's rights. These rights include permissions such as print, view, execute, play and constraints such as time limit or number of views. When user requests access, to a specific file, a DRM license consisting of decryption keys along with rights information is passed to DRM server. DRM users should be authenticated to the server in every interaction for security reasons.

Figure 3:
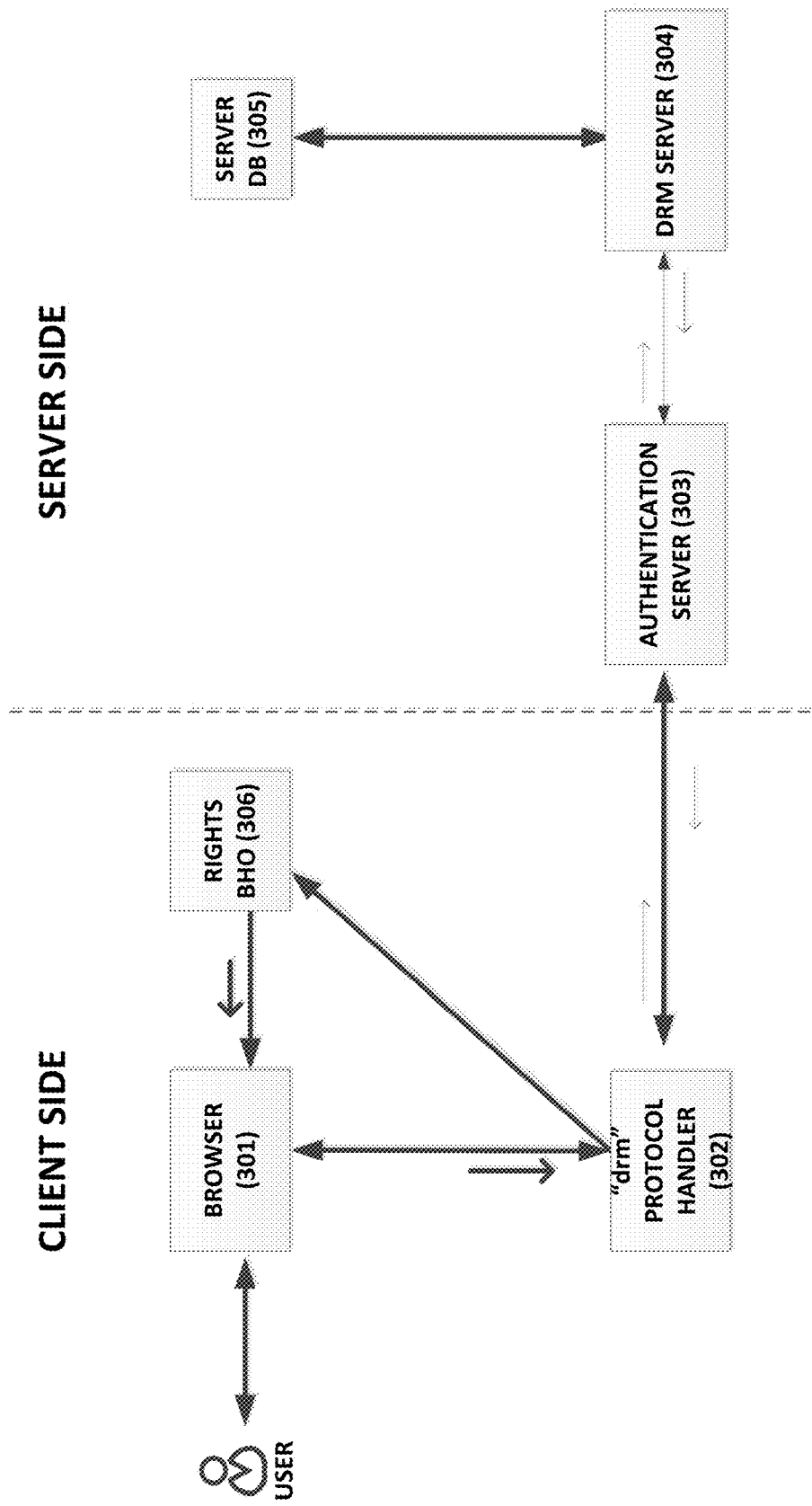
FIG. 3 describes a preferred embodiment of the system of the present disclosure.

FIG. 3 will describe a preferred embodiment of a system (300) for the present disclosure.

One embodiment of the present system comprises a browser (300) for a user to request a protected web content. The browser can be installed on any computing device. Such computing device includes but not limited to, desktop, laptops, kiosks, handheld devices including handheld communication devices, and other such computing devices which can be used to request a web content.

In one embodiment, the browser is configured to fetch an appropriate content handler (302) to take care of the user's request for the web content. In an embodiment the content handler can be a Protocol Handler. In another embodiment, the content handler can be a MIME type filter. Any other content handler which can be used to handle requests for a protected web content can be used. The content handler is decided based on the request format of the user. In case of a protocol handler, the user will request the content with protocol scheme "drm://". Other supported protocols are http, https, ftp etc.

In an embodiment, an authentication server (303) receives the request forwarded to it by the content handler. The authentication has means to accept the transmission. It also accepts the user profile, or user authentication information from the content handler. The authentication server checks if the user has sufficient rights to request for the web page. Since the user has selective rights on the content, it needs to be determined that on what content type, the user has what rights.

Once the user is authenticated, the DRM server (304) receives the request from the authentication server. In case the user is not authenticated, the authentication server returns an error message which is rendered by content handler to the browser.

In an embodiment, the DRM server is configured to fetch the data from the web server (305) and transmit it back to the content handler. The DRM server fetches the web content, the rights of the user for the web content, and a decryption key.

The encrypted web pages are organized at server side in a hierarchical folder structure. If a file, such as "drm://server:port/A/B/a.html", wants to call the b.jpg file in folder A, then the relative url would simply be "../b.jpg".

The base url i.e., "drm://server:port/virtualdir" needs to be specified at the time of defining the content handler where virtualdir is the directory one level top to the folder from where the context begins. Here in the example, the virtual directory lies one level up (folder A) hence context begins from folder A. Then onwards the files can be called using relative url from within another file.

The system further comprises a browser plugin (306) which receives the web content, the user rights and the decryption key from the content handler. The browser plugin can be Browser Helper Object, or any suitable plugin for a browser.

In an example, whenever the user tries to access the protected content using DRM client using the browser, the user is prompted for authentication, which is routed to IIS web server. If the client authentication succeeds, the request is passed on to tomcat server. The response is returned from tomcat (application server) back to IIS which is then further forwarded to the client application. Following is a description of the components of the system.

Windows Active Directory. It serves as a central repository for network administration and security. It authenticates and authorizes all users and computers within a windows network of Windows domain. It stores the information of all the users authenticated by it.

Authentication Server. It is the authentication server which is being used to authenticate the end user using Integrated Windows Authentication. It does so through a connection to active directory.

Web Server. It is the application server which contains the business logic for managing and protecting the content. An example can be Tomcat server.

Database Server. It is the server side database which stores files, users' rights and permissions. An example can be SQL server.

Custom Audio Player. It is the integrated DRM client through which end user can play DRM protected content.

Figure 4:
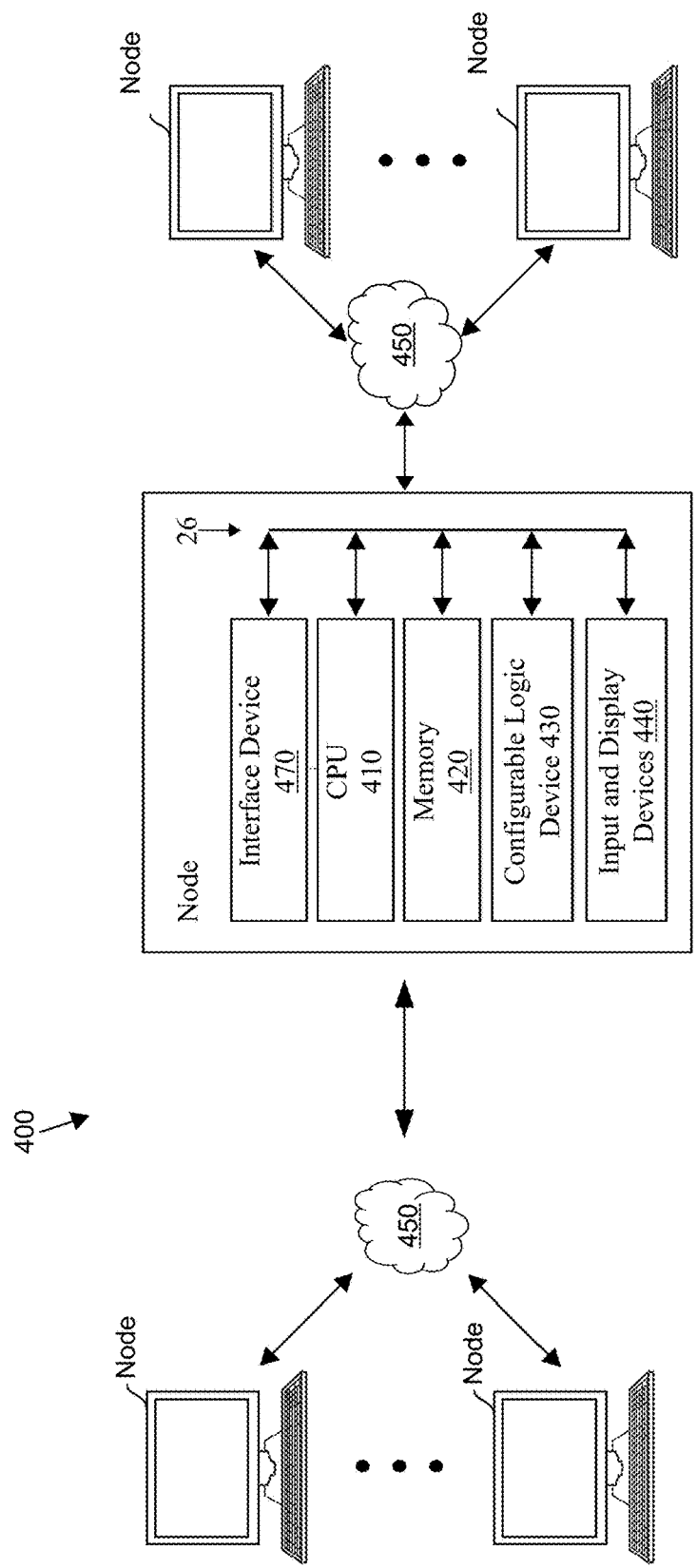
FIG. 4 describes an exemplary environment of a client server architecture.

FIG. 4 describes the above system with a detail about the structure of client and server system. The client and server system are coupled together by Wide Area Network (WAN) 450, although the environment can include other types and numbers of devices, components, elements and communication networks in other topologies and deployments. While not shown, the exemplary environment may include additional components, such as routers, switches and other devices which are well known to those of ordinary skill in the art and thus will not be described here.

In the present disclosure the client refers to browsers in any computing machine or handheld device. The client interacts with the server WAN 450 although the interaction can be using any other network topologies. Additionally, the network can be hosted on a cloud or could be provided as a service.

The server systems includes at least one processor 410, memory 420, optional configurable logic 430, input and display devices 440, and interface device 470 which are coupled together by bus, although the nodes may comprise other types and numbers of elements in other configurations.

Processor(s) 410 may execute one or more computer-executable instructions stored in the memory 420 for the methods illustrated and described with reference to the examples herein, although the processor(s) 410 can execute other types and numbers of instructions and perform other types and numbers of operations. The processor(s) 410 may comprise one or more central processing units ("CPUs") or general purpose processors with one or more processing cores, such as AMD® processor(s), although other types of processor(s) could be used (e.g., Inter)).

Memory 420 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 420 may store one or more non-transitory computer-readable instructions of this technology as illustrated and described with reference to the examples herein that may be executed by the one or more processor(s). FIGS. 1 and 2 are representative of example steps or actions of this technology that may be embodied or expressed as one or more non-transitory computer or machine readable instructions stored in memory that may be executed by the processor(s) 410.

Input and display devices 440 enable a user, such as an administrator, to interact with the systems such as to input and/or view data and/or to configure, program and/or operate it by way of example only. Input devices may include a touch screen, keyboard and/or a computer mouse and display devices may include a computer monitor, although other types and numbers of input devices and display devices could be used. Additionally, the input and display devices can be used by the user, such as an administrator to develop applications using Application interface.

The interface device in the nodes is used to operatively couple and communicate between the nodes which are all coupled together by LAN and WAN. By way of example only TCP/IP can be over Ethernet and industry-standard protocols.

Although an exemplary environment with the client and server systems are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for accessing digitally protected web content, the method comprising:
    receiving, by a content handler computing device, a request from a user for the web content comprising a webpage from a digital protected web content server, wherein the received request comprises a request for a web page and a specific digital rights management protocol, and wherein a protocol handler for the specific digital rights management is searched and invoked;
    transmitting, by the content handler computing device, authentication data of the user and the request for the web content to an authentication server associated with the web content server, for verification of access rights of the user to access the requested web content wherein the user has selective access rights on the web content; and
    retrieving, by the content handler computing device, the requested web content and the verified selective access rights from the web content server when the selective access rights of the user for the requested web content are verified and forwarding the retrieved web content and the verified selective access rights to a web plugin installed on a web browser, wherein the retrieved web content is a portion of the webpage extracted from the requested web content based on the verified selective access rights, wherein the retrieved portion of the webpage is viewable to a user device via the web plugin on the web browser and a remaining portion of the requested web content is not viewable to the user device.

2. The method as claimed in claim 1, wherein the user requests the web content at the content handler computing device using a predefined protocol handler which is a plugin which handles the user's request on the protocol for which it is registered.

3. The method as claimed in claim 1, wherein the user requests the web content at the content handler computing device using a MIME type filter.

4. The method as claimed in claim 1, further comprising requesting a key at the content handler computing device, for the protected web content from the web content server.

5. The method as claimed in claim 1, wherein the retrieved verified selective access rights are applied to the web content using a web browser plug-in at the content handler computing device.

6. A non-transitory computer-readable medium storing computer-readable instructions that, when executed by one or more computing devices, cause at least one of the one or more computing devices to:
    request for a web content comprising a webpage from a digital protected web content server, wherein the received request comprises a request for a web page and a specific digital rights management protocol, and wherein a protocol handler for the specific digital rights management is searched and invoked;
    transmit authentication data of the user along with the request for the web content to an authentication server associated with the web content server, for verification of access rights of the user to access the requested web content wherein the user has selective access rights on the web content; and
    retrieving the requested web content and the verified selective access rights from the web content server when the selective access rights of the user for the requested web content are verified and forwarding the retrieved web content and the verified selective access rights to a web plugin installed on a web browser, wherein the retrieved web content is a portion of the webpage extracted from the requested web content based on the verified selective access rights, wherein the retrieved portion of the webpage is viewable to a user device via the web plugin on the web browser and a remaining portion of the requested web content is not viewable to the user device.

7. The non-transitory computer-readable medium of claim 6, wherein the user requests the web content using a predefined protocol handler which is a plugin which handles the user's request on the protocol for which it is registered.

8. The non-transitory computer-readable medium of claim 6, wherein the user requests the web content using a MIME type filter.

9. The non-transitory computer-readable medium of claim 6, further comprises request a key for the protected web content from the web content server.

10. The non-transitory computer-readable medium of claim 6, wherein the retrieved verified access rights are applied to the web content using a web browser plug-in.

11. A content handler computing device comprising:
    a processor;
    a memory coupled to the processor which is configured to be capable of executing programmed instructions comprising and stored in the memory to:
    request a web content comprising a webpage from a digital protected web content server, wherein the received request comprises a request for a web page and a specific digital rights management protocol, and wherein a protocol handler for the specific digital rights management is searched and invoked;
    transmit authentication data of the user along with the request for the web content to an authentication server associated with the web content server, for verification of access rights of the user to access the requested web content wherein the user has selective access rights on the web content; and
    retrieve the requested web content and the verified selective access rights from the web content server when the selective access rights of the user for the requested web content are verified and forwarding the retrieved web content and the verified selective access rights to a web plugin installed on a web browser, wherein the retrieved web content is a portion of the webpage extracted from the requested web content based on the verified selective access rights, wherein the retrieved portion of the webpage is viewable to a user device via the web plugin on the web browser and a remaining portion of the requested web content is not viewable to the user device.

12. The device as set forth in claim 11 wherein the user requests the web content using a predefined protocol handler which is a plugin which handles the user's request on the protocol for which it is registered.

13. The device as set forth in claim 11 wherein the user requests the web content using a MIME type filter.

14. The device as set forth in claim 11 further comprises request a key for the protected web content from the web content server.

15. The device as set forth in claim 11 wherein the retrieved verified access rights are applied to the web content using a web browser plug-in.

* * * * *